United States Patent
Park

(10) Patent No.: US 8,944,086 B2
(45) Date of Patent: Feb. 3, 2015

(54) PLUMBING FREEZE PROTECTION SYSTEM

(76) Inventor: James F. Park, Park City, UT (US)

( * ) Notice: Subject to any disclaimer, the term of this patent is extended or adjusted under 35 U.S.C. 154(b) by 39 days.

(21) Appl. No.: 13/539,998

(22) Filed: Jul. 2, 2012

(65) Prior Publication Data

US 2014/0000724 A1 Jan. 2, 2014

(51) Int. Cl.
- *E03B 7/12* (2006.01)
- *F16L 55/00* (2006.01)
- *E03B 7/08* (2006.01)

(52) U.S. Cl.
CPC . *F16L 55/00* (2013.01); *E03B 7/08* (2013.01); *E03B 7/12* (2013.01)
USPC .............................................. 137/62; 137/80

(58) Field of Classification Search
CPC .............. F16K 17/36; E03B 7/10; E03B 7/12
USPC ........................ 137/59, 62, 80, 337
See application file for complete search history.

(56) References Cited

U.S. PATENT DOCUMENTS

| | | | | |
|---|---|---|---|---|
| 299,392 A * | 5/1884 | Jay | | 137/62 |
| 330,664 A * | 11/1885 | Bacon | | 137/62 |
| 2,842,155 A * | 7/1958 | Peters | | 137/337 |
| 3,103,946 A * | 9/1963 | Troxell | | 137/337 |
| 3,346,191 A * | 10/1967 | Roach | | 239/135 |
| 3,420,252 A * | 1/1969 | Stroble | | 137/59 |
| 4,023,585 A * | 5/1977 | VandenBurg | | 137/80 |
| 4,216,554 A | 8/1980 | Glueckert et al. | | |
| 4,481,966 A | 11/1984 | Anderson | | |
| 4,635,668 A * | 1/1987 | Netter | | 137/62 |
| 4,672,990 A * | 6/1987 | Robillard | | 137/59 |
| 4,848,389 A | 7/1989 | Pirkle | | |
| 5,265,544 A * | 11/1993 | Bigelow et al. | | 110/345 |
| 5,287,876 A | 2/1994 | Takahashi | | |
| 5,921,270 A | 7/1999 | McCarty | | |
| 6,021,798 A * | 2/2000 | Martin | | 137/62 |
| 2006/0112989 A1* | 6/2006 | Rode et al. | | 137/62 |

* cited by examiner

*Primary Examiner* — Stephen M Hepperle
*Assistant Examiner* — R. K. Arundale
(74) *Attorney, Agent, or Firm* — Thorpe North & Western LLP

(57) ABSTRACT

A plumbing freeze protection system comprises a fluid connection between a water supply line and a waste line. The fluid connection bypasses a plumbing fixture fluidly connected to the water supply line. A valve operable with the fluid connection alternately prevents water flow from the water supply line to the waste line, and allows water flow from the water supply line to the waste line within about 25 percent of maximum volumetric flow rate of the water supply line through the fluid connection. A timer is adapted to control the valve. The valve is open for a predetermined time period to deliver a short duration, high volumetric flow rate of water to the waste line to minimize ice formation in, and remove existing ice from, the water supply and waste lines.

19 Claims, 5 Drawing Sheets

PLUMBING FREEZE PROTECTION SYSTEM

BACKGROUND

Many people own or have access to vacation properties that are only used for part of the year. These properties can be vulnerable to plumbing-related problems due to the periods of non-use. For example, trap seals in drains can dry out, allowing odors to be released into the living spaces of the properties. In addition, elastomer seals can dry out from non-use and rupture, necessitating expensive and inconvenient repairs. Also, these properties are often located in areas that experience freezing temperatures when the owners are not there, which can cause pipes or other plumbing related items, such as ejection pumps, to freeze. Again, this can necessitate expensive and inconvenient repairs. Traditionally, owners of such properties have resorted to hiring people to visit the properties and flush toilets, run faucets, etc. in order to maintain water seals in the traps and exercise elastomer seals. However, this is ineffective at preventing freezing of pipes.

DETAILED DESCRIPTION

Figure 1:
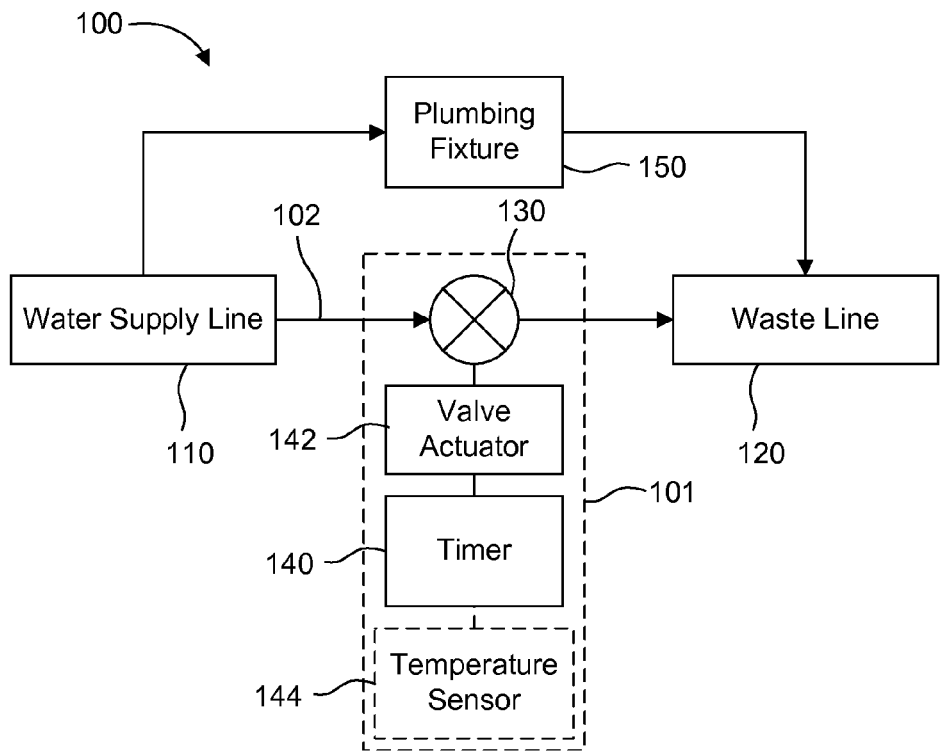
FIG. 1 is a schematic illustration of a plumbing freeze protection system in accordance with an example of the present disclosure.

Reference will now be made to certain examples, and specific language will be used herein to describe the same. Examples discussed herein set forth a plumbing freeze protection system that minimizes ice formation and removes existing ice from supply and waste lines. In particular examples, the plumbing freeze protection system can include features that maintain water seals in traps.

Specifically, a plumbing freeze protection system can comprise a fluid connection between a water supply line and a waste line, wherein the fluid connection bypasses a plumbing fixture fluidly connected to the water supply line. The plumbing freeze protection system can also comprise a valve operable with the fluid connection to alternately prevent water flow from the water supply line to the waste line, and allow water flow from the water supply line to the waste line within about 25 percent of maximum volumetric flow rate of the water supply line through the fluid connection. Additionally, the plumbing freeze protection system can comprise a timer adapted to control the valve, wherein the valve is open for a predetermined time period to deliver a short duration, high volumetric flow rate of water to the waste line to minimize ice formation in, and remove existing ice from, the water supply and waste lines.

In another example, a plumbing freeze protection system can comprise a fluid connection between a water supply line and a waste line. The plumbing freeze protection system can also comprise a valve disposed at an outlet end of a faucet and operable with the fluid connection to alternately prevent water flow from the water supply line to the waste line, and allow water flow from the water supply line to the waste line within about 25 percent of maximum volumetric flow rate of the water supply line through the fluid connection. Additionally, the plumbing freeze protection system can comprise a timer adapted to control the valve, wherein the valve is open for a predetermined time period to deliver a short duration, high volumetric flow rate of water to the waste line to minimize ice formation in, and remove existing ice from, the water supply and waste lines.

In yet another example, a plumbing freeze protection system can comprise a fluid connection between a water supply line and a waste line via a tank overflow tube for a toilet. The plumbing freeze protection system can also comprise a valve operable with the fluid connection to alternately prevent water flow from the water supply line to the waste line, and allow water flow from the water supply line to the waste line within about 25 percent of maximum volumetric flow rate of the water supply line through the fluid connection. Additionally, the plumbing freeze protection system can comprise a timer adapted to control the valve, wherein the valve is open for a predetermined time period to deliver a short duration, high volumetric flow rate of water to the waste line to minimize ice formation in, and remove existing ice from, the water supply and waste lines, and to maintain a water seal in a trap associated with the toilet.

In still another example, a plumbing freeze protection system can comprise a fluid connection between a water supply line and a waste line. The plumbing freeze protection system can also comprise an ejection pump fluidly coupled to the waste line below ground level, the ejection pump being operable to pump waste matter up to a sewer line. Furthermore, the plumbing freeze protection system can comprise a valve operable with the fluid connection to alternately prevent water flow from the water supply line to the waste line, and allow water flow from the water supply line to the waste line within about 25 percent of maximum volumetric flow rate of the water supply line through the fluid connection. Additionally, the plumbing freeze protection system can comprise a timer adapted to control the valve, wherein the valve is open for a predetermined time period to deliver a short duration, high volumetric flow rate of water to the waste line to minimize ice formation in, and remove existing ice from, the water supply line, the waste line, and the ejection pump.

Furthermore, a plumbing maintenance system in accordance with the principles herein can comprise a plurality of fluid connections between a water supply line and a plurality of waste lines, each waste line having a trap seal. The plumbing maintenance system can also comprise a valve operable with the plurality of fluid connections to alternately prevent water flow from the water supply line to the plurality of waste lines, and allow water flow from the water supply line to the plurality of waste lines. Additionally, the plumbing maintenance system can comprise a timer adapted to control the valve, wherein the valve is open for a predetermined time period to deliver water for a short duration to the plurality of waste lines to maintain water in the trap seals.

With these general examples set forth above, it is noted in the present disclosure that when describing the plumbing freeze protection system described herein, or their related methods, each of these descriptions are considered applicable to the other, whether or not they are explicitly discussed in the context of that embodiment. For example, in discussing the plumbing freeze protection system per se, the method embodiments are also included in such discussions, and vice versa.

Furthermore, various modifications and combinations can be derived from the present disclosure and illustrations, and as such, the following figures should not be considered limiting. It is noted that reference numerals in various FIGS. will be shown in some cases that are not specifically discussed in that particular figure. Thus, discussion of any specific reference numeral in a given figure is applicable to the same reference numeral of related figures shown herein.

Illustrated in FIG. 1 is a plumbing freeze protection system 100. The system can include a fluid connection 102 between a water supply line 110 and a waste line 120. A water supply line can include a main line or an individual distribution line. For example, a water supply line can include a main water line in a residential building or a cold and/or hot water supply line. A waste line can include a drain or a sewer line. For example, a waste line can include a drain line for an individual appliance, such as a toilet, or a waste line can include a main sewage line for a residence.

In one aspect, the fluid connection 102 between the water supply line 110 and the waste line 120 can simply be set up via a preexisting supply and drain relationship, such as a supply line providing water to a sink, which is then emptied into a drain for the sink. In another aspect, the fluid connection can be via a separate pipe or line that bypasses or short circuits a preexisting fluid connection. For example, a water supply line can be configured to divert water "upstream" of a faucet, to a drain line for a sink that receives water from the faucet. In this way, the fluid connection can bypass the faucet and/or sink and deliver water beneath the drain, which can provide for normal use of the plumbing fixture. Thus, in many instances, this fluid connection or bypass system can be hidden from view beneath a cabinet or elsewhere, thought this is not required. Any suitable device or method can be used to effectuate the fluid connection. In one embodiment, a three-way connector can be fitted to the water supply line and/or the waste line to facilitate the fluid connection between the lines. In another embodiment, a self-piercing saddle can be used to tap into the water supply line and/or the waste line to facilitate the fluid connection between the lines. These and other aspects of the fluid connection are discussed in more detail hereinafter.

The plumbing freeze protection system 100 can also include a valve 130 operable with the fluid connection 102 to alternately prevent and allow water flow from the water supply line 110 to the waste line 120. In operation, the valve can be open for a predetermined time period to deliver a short duration, high volumetric flow rate of water from the supply line to the waste line. The short duration, high volume of water can minimize ice formation in the water supply line and the waste line, as well as remove existing ice from the lines. In one aspect, the valve can allow water flow from the water supply line to the waste line within about 25 percent of maximum volumetric flow rate of the water supply line through the fluid connection. In another example, the valve can allow water flow from the water supply line to the waste line within about 10 percent of the maximum volumetric flow rate, or even allow substantially the entire volumetric flow rate of the water supply, being only limited by what is practically possible with the valve selected for use.

Thus, in describing this and other embodiments herein, when the valve is open, the valve can be configured to be minimally restrictive of water flow to take advantage of the available water supply volumetric flow rate potential in order to minimize or eliminate ice in the supply and waste lines. Stated another way, the present disclosure describes systems wherein relatively short bursts (e.g., a few seconds to a few minutes) of relatively high volumes of water are used in a total loss system to control ice, rather than the movement of water through a closed circuit supply systems. Thus, the present disclosure describes high volume, total loss plumbing systems where short bursts of large volumes of water are used to protect both the supply lines as well as the waste lines of a plumbing system.

Returning to FIG. 1, to control the valve 130, the plumbing freeze protection system 100 can include a timer 140. The timer can be programmed to allow a short duration, high volumetric flow rate of water at any given interval. An interval can be a uniform, a non-uniform, or a randomly selected interval. In one aspect, the interval can be predetermined to provide the water flow prior to ice formation. In another aspect, some ice formation may be permissible, as long as at least a portion of the formed ice can be removed from the line when the water flows. It is contemplated that the flow of water can be sufficient to "blast" or otherwise remove a certain amount of ice from the line, unlike a "drip" water flow in which water flows at a low or a minimal flow rate in an attempt to prevent the line from freezing. The drip approach can lead to ice build-up about the inner wall of the line, which can eventually accumulate such that the line is effectively blocked or, worse, ruptured by the ice. As previously mentioned, the timer controls the valve such that the valve is open for a predetermined time period to deliver a short duration, high volumetric flow rate of water from the supply line to the waste line. The timer can be programmed to vary the duration of the water flow for each interval. The duration period can be uniform or non-uniform across water flow intervals. In one aspect, the duration period can be randomly selected.

The timer 140 can control the valve via a valve actuator 142. The valve actuator can be any device operable to open and/or close the valve, such as a mechanical device, an electrical device, an electromechanical device, or any other suitable device. In one embodiment, the valve actuator comprises a solenoid actuatable by a command signal from the timer to open and/or close the valve.

It is also contemplated that the valve can be controlled by a temperature sensor 144, such as a thermocouple or thermometer. In one aspect, the temperature sensor indirectly controls the valve by controlling the timer 140. For example, the temperature sensor can activate the timer when a temperature at a given location, such as in the vicinity of the supply and/or waste lines, falls below a predetermined value, such as 40 degrees F. This can cause the timer to control the valve to deliver water flow at a given interval as long as the temperature does not exceed the predetermined value. On the other hand, the temperature sensor can deactivate the timer when a temperature at a given location exceeds a predetermined value, such as 40 degrees F. This can prevent the timer from controlling the valve to deliver water flow at a given interval as long as the temperature does not fall below the predetermined value. Thus, the combination of the timer and the temperature sensor can operate to prevent line freezing when such protection is needed without wasting water when freeze protection is not needed. In one aspect, the timer, the valve actuator, the valve, and/or temperature sensor can be components of a freeze protection device 101, discussed in further detail hereinafter.

The system can be termed an "open" system, in that the water delivered from the supply line to the waste line is lost and not recovered or recycled for further use in the system. The system can also maintain both the supply line and the waste line, which can be indoor and/or outdoor lines, substantially free from ice.

In the example illustrated in FIG. 1, the fluid connection 102 bypasses a plumbing fixture 150 fluidly connected to the water supply line 110. The plumbing fixture can include any type of plumbing fixture, such as a faucet, a washing machine, a toilet, a sink, a tub, a dishwasher, a refrigerator, an ice maker, a water heater, a water softener, a radiant heater, a water tank, a drinking fountain, a shower, a bidet, a urinal, etc.

Figure 2:
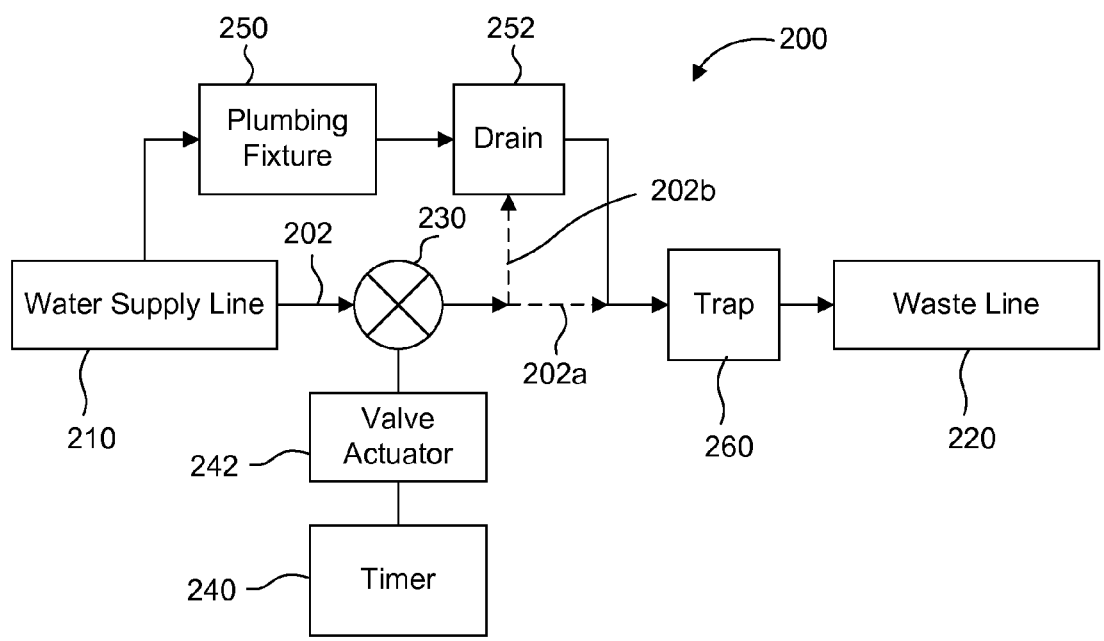
FIG. 2 is a schematic illustration of a plumbing freeze protection system in accordance with a further example of the present disclosure.

Referring to FIG. 2, illustrated is another embodiment of a plumbing freeze protection system 200. This embodiment is similar in many respects to the embodiment illustrated in FIG. 1, and, as with other figures, uses similar reference numbers to indicate similar features. This embodiment illustrates the water supply line 210 fluidly connected to the waste line 220 via a trap seal 260, such as a P-trap, J-trap, S-trap, or other such water trap. In this configuration, the normal operation of the valve 230 as controlled by the timer 240 and actuated by the valve actuator 242, provides the additional benefit of maintaining water in the traps to maintain a seal, which may be lost due to evaporation over time.

In one aspect, in addition to bypassing a plumbing fixture 250, the fluid connection 202 can also bypass (indicated at 202a) a drain 252 for the plumbing fixture 250 fluidly connected to the waste line 220. For example, the water supply line can be tapped to form the fluid connection with the waste line upstream of a connection with a faucet 250, which is configured to deliver water to a sink or bathtub having a drain 252. The fluid connection can be downstream of the drain, such that water from the drain flows into the fluid connection between the supply and waste lines. The fluid connection, valve, valve actuator, and timer can all be located discretely below the sink, such as in a cabinet or other fixture.

In another aspect, the fluid connection 202 can bypass the plumbing fixture 250, but not the drain 252 (indicated at 202b) for the plumbing fixture 250. As with the previous example, the water supply line can be tapped to form the fluid connection 202 with the waste line upstream of a connection with the faucet 250. In this case, however, the fluid connection can also be upstream of the drain for the sink or bathtub, such that water in the fluid connection flows into the drain. In other words, the water supply line and the waste line are fluidly connected via the sink or bathtub and the drain. A hose or similar conduit can be used to deliver water exiting the valve 230 to the sink drain. This allows the waste line to be in fluid communication with the supply line, while bypassing the faucet, without tapping into, or otherwise structurally coupling to a waste line pipe.

In another example, an end of a hose forming the fluid connection 202 can be coupled to the supply line 210 for a washing machine 250 with a three-way connector. An opposite end of the hose can be directed into the drain 252 for the washing machine. The valve 230 operable to control water flow through the hose can be controlled by the timer 240 via the solenoid 242. Thus, the washing machine can be bypassed by the hose to allow water to flow through the supply line and the waste line to prevent or minimize ice build-up in the lines. This configuration can be readily retrofitted to an existing washing machine plumbing arrangement.

Figure 3:
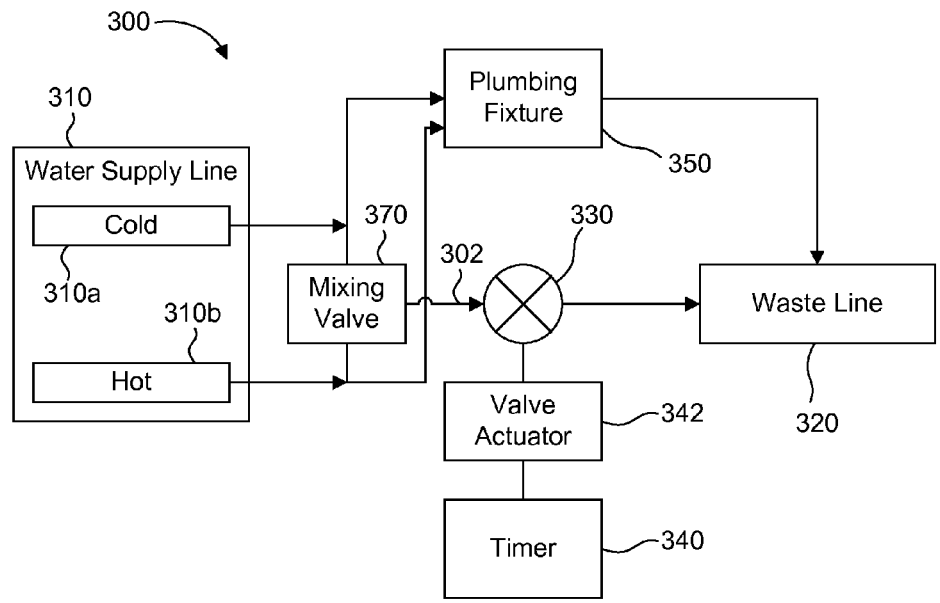
FIG. 3 is a schematic illustration of a plumbing freeze protection system in accordance with still a further example of the present disclosure.

FIG. 3 illustrates another embodiment of a plumbing freeze protection system 300. As with the previously discussed embodiments, the system includes a fluid connection 302 between a water supply line 310 and a waste line 320 with flow that is regulated by a valve 330 controlled by a timer 340 via a valve actuator 342. This embodiment also illustrates a mixing valve 370 in the fluid connection between the water supply line and the waste line. Specifically, the mixing valve can be fluidly connected to a cold water line 310a and a hot water line 310b such that flow through the mixing valve allows for flow through both the cold and hot water lines. Providing for flow through both the cold and hot water lines can minimize ice formation and remove existing ice from the cold and hot water lines, in addition to the similar benefits to the waste line discussed herein. In addition, because of the flow through the hot water line, a water heater in fluid communication with the hot water line can be protected from ice, as well. In one aspect, the mixing valve operates automatically as water flows through the fluid connection as regulated by the valve 330. Typically, the mixing valve can be mechanical in nature, but any suitable mixing valve or device for facilitating water flow from the hot and cold water lines during the period of water flow through the fluid connection can be used.

Figure 4:
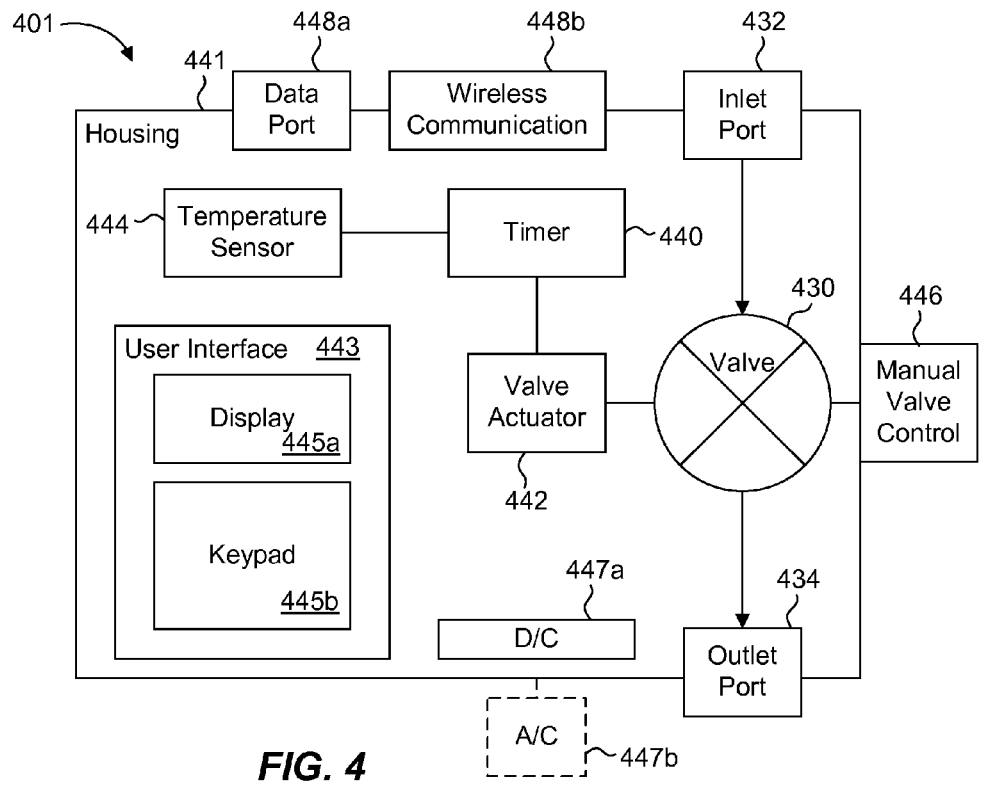
FIG. 4 is a schematic illustration of a plumbing freeze protection device in accordance with an example of the present disclosure.

With reference to FIG. 4, illustrated is a plumbing freeze protection device 401. As mentioned above, the device can include a valve 430 operable with a fluid connection to alternately prevent and allow water flow from a water supply line to a waste line. The valve can be controlled by a timer 440 via a valve actuator 442. Additionally, a temperature sensor 444 can indirectly control operation of the valve by activating or deactivating the timer based on a given temperature.

The device can also include a housing 441 to support and protect one or more of the various components of the device. In one aspect, the housing can include an inlet port 432 to receive water from the water supply and an outlet port 434 to discharge water to the waste line. The inlet and outlet ports can therefore facilitate coupling of the valve to the fluid connection. The device can also include a manual valve control 446, such as a handle, knob, or lever, to facilitate control of the valve by a user. This can allow the user to operate the valve independent of the timer and/or the valve actuator. Additionally, electrically powered components, such as the timer 440 or a solenoid valve actuator 442, can receive direct current (D/C) power 447a (i.e., via a battery) and/or alternating current (A/C) power 447b (i.e., via a power cord). An audible and/or visual alert can be provided to make the user aware of a low battery.

In one aspect, the timer 440 and/or the temperature sensor 444 can be programmed by a user. A user interface 443 can be included to facilitate programming. The user interface can have a display 445a and/or a keypad 445b. This can allow the user to set the water flow time interval, the water flow duration period, the date and/or time of day that the timer should be actively controlling the valve, the temperature at which the timer should be actively controlling the valve, or any other desirable parameter or control aspect. The timer and/or temperature sensor can include default settings that can be automatically applied in the event of a programming, memory, or power failure. It should be recognized that a timer and/or a temperature sensor can include a user interface independent of one another as well as in embodiments that do not include a device 401.

Additionally, a data port 448a and/or a wireless communication terminal 448b can be utilized to facilitate programming of the timer and/or temperature sensor. In one aspect, the data port can interface with any form of memory storage device, such as the various USB standard interfaces or any memory card standard interface format. In another aspect, the data port can facilitate a connection to a computer network to provide remote and/or local programming access to the device. In yet another aspect, software can be provided to allow the user to set programming or control parameters on a remote computer, such as a PC or a smart phone, and transfer the data to the timer and/or temperature sensor via the data port or the wireless communication terminal. The data port and/or wireless communication terminal can also be used to communicate information pertaining to the system to a user, such as current temperature, battery level, alerts, etc. It should be recognized that a timer and/or a temperature sensor can include a data port and/or a wireless communication terminal independent of one another as well as in embodiments that do not include a device 401.

Figure 5:
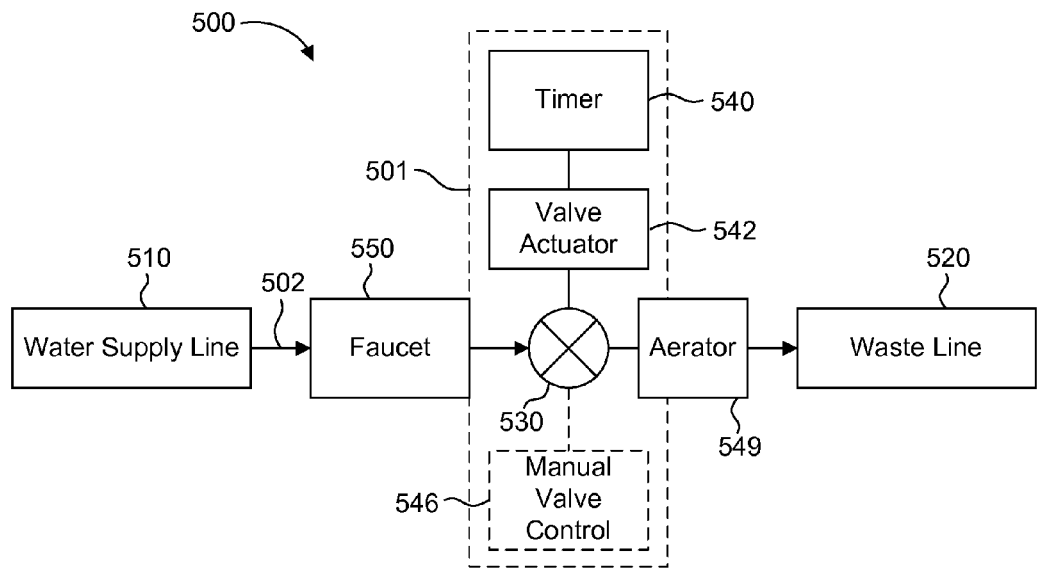
FIG. 5 is a schematic illustration of a plumbing freeze protection system in accordance with another example of the present disclosure.

Referring to FIG. 5, an embodiment of a plumbing freeze protection system 500 is illustrated. As with previously discussed embodiments, the system includes a fluid connection 502 between a water supply line 510 and a waste line 520 with flow that is regulated by a valve 530 controlled by a timer 540 via a valve actuator 542. In this embodiment, the timer, valve actuator, and the valve can all be included in a plumbing freeze protection device 501, as discussed hereinabove. The device can couple to or be disposed at an outlet end of a faucet 550. For example, the device can couple via threads to an end of the faucet in place of an aerator of the faucet. Accordingly, the device can also include an aerator 549 to replace the original faucet aerator. Thus, the fluid connection can be by way of the faucet and an associated sink or tub. The device 501 can also include a manual valve control 546 operable to allow a user to control water flow through the faucet independent of the timer 540.

In use, the normal faucet controls can be set to allow a maximum flow of water through the faucet. In this configuration, the valve 530 can regulate the flow of water from the faucet. Thus, the device 501 can be configured to automatically deliver water for a predetermined time period as controlled by the timer 540 and disclosed herein. With the manual valve control 546, the user can operate the faucet to deliver water in between water flow intervals or, if desired, the user can close the valve during a period of water flow. Thus, the manual valve control can allow use of the faucet even with the device in place and functioning normally. In another aspect, the valve can be configured to open when the timer is turned off or inactivate. Thus, with the device installed on the faucet, deactivating the timer can cause the valve to open, which can allow normal use of the faucet.

Figure 6:
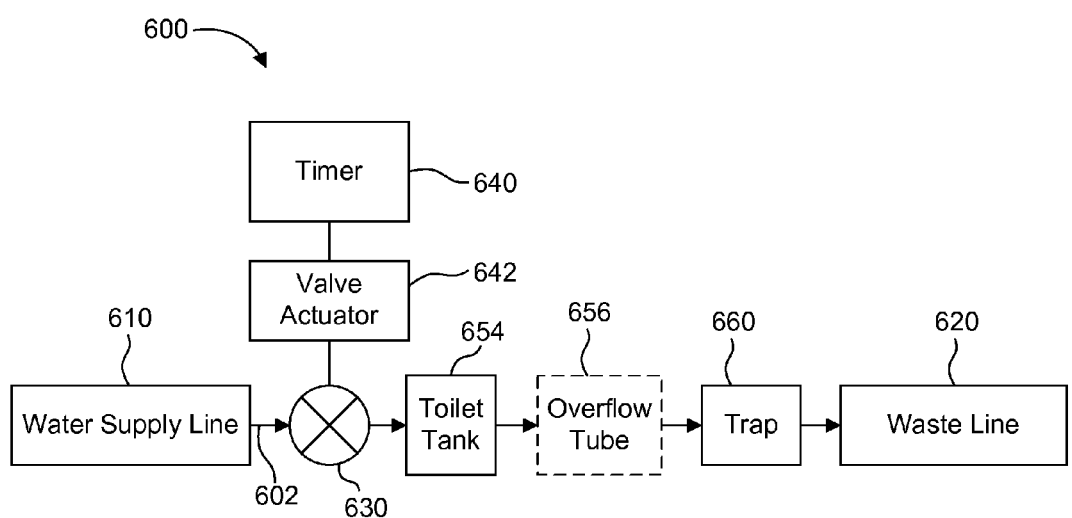
FIG. 6 is a schematic illustration of a plumbing freeze protection system in accordance with yet another example of the present disclosure.

FIG. 6 illustrates another embodiment of a plumbing freeze protection system 600. In this embodiment, a fluid connection 602 between a water supply line 610 and a waste line 620 can be by way of a tank 654 for a toilet, for example, by delivering water to the tank. In one aspect, a flush valve in the tank can be open, such that water flows out of the tank via the flush valve. In another aspect, the fluid connection between the water supply line and the waste line can be by way of a toilet tank overflow tube 656 for the toilet. For example, the supply line can deliver water to the tank in order to fill up the tank until water overflows into the tank overflow tube. In another example, the supply line can deliver water directly into the tank overflow tube. As disclosed herein, a valve 630 can be operable with the fluid connection to alternately prevent and allow water flow from the water supply line to the waste line, as controlled by a timer 640 via a valve actuator 642. This configuration can facilitate water flow into a trap seal 660 associated with the toilet and into the waste line 620. Thus, a short duration, high volumetric flow rate of water to the waste line can minimize ice formation and remove existing ice from the water supply and waste lines, as well as maintain a water seal in the trap.

Figure 7:
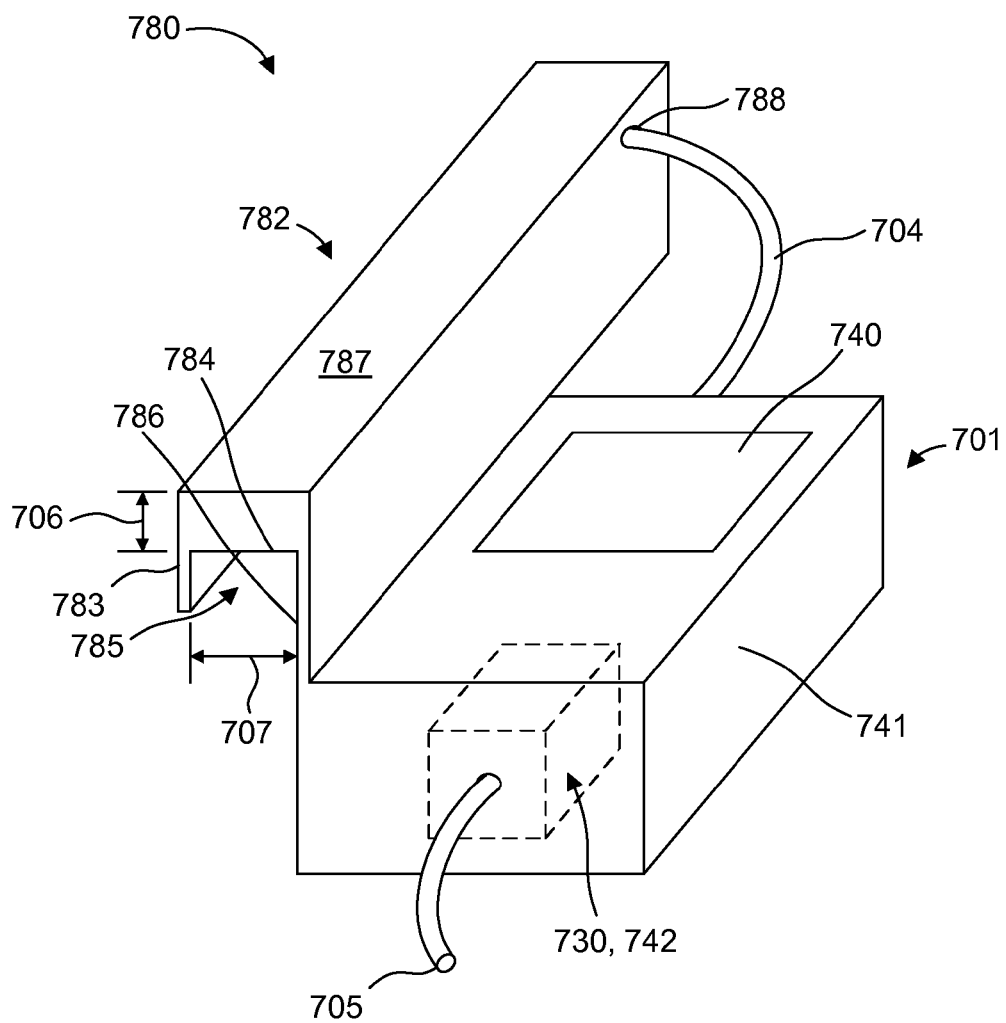
FIG. 7 is a schematic illustration of a bracket to support a fluid line of a plumbing freeze protection system in accordance with an example of the present disclosure.

FIG. 7 illustrates a bracket 780 that can be used with the embodiment of FIG. 6 to mount various components of the system. For example, the bracket can be configured to support a fluid line 704 of a fluid connection about a top of a toilet tank and direct an end 705 the fluid line such that water flows from the fluid line directly into a toilet tank or into a tank overflow tube. The bracket can include a clip 782 to support the bracket from a top edge of the toilet tank. The clip can include a tab 783 spaced at a distance 707 from a back surface 784 of the bracket to form a channel 785 to receive a top edge of the toilet tank. This can allow the bracket to hang from, and be supported by, the top of the toilet tank. The clip can also be configured to allow the fluid line to pass under a lid for the toilet tank without being compressed or deformed. For example, a base 786 of the channel operable to contact the top edge of the toilet tank can be spaced at a distance 706 from a top surface 787 of the clip. This distance can be sufficient to allow the fluid line to pass through an opening 788 in the top of the clip. The top surface of the clip can therefore support the lid without the fluid line being compressed or deformed. A timer 740, valve actuator 742, and valve 730 can all be included in a housing 741 of a plumbing freeze protection device 701. The device can be coupled to, and supported by, the clip.

Figure 8:
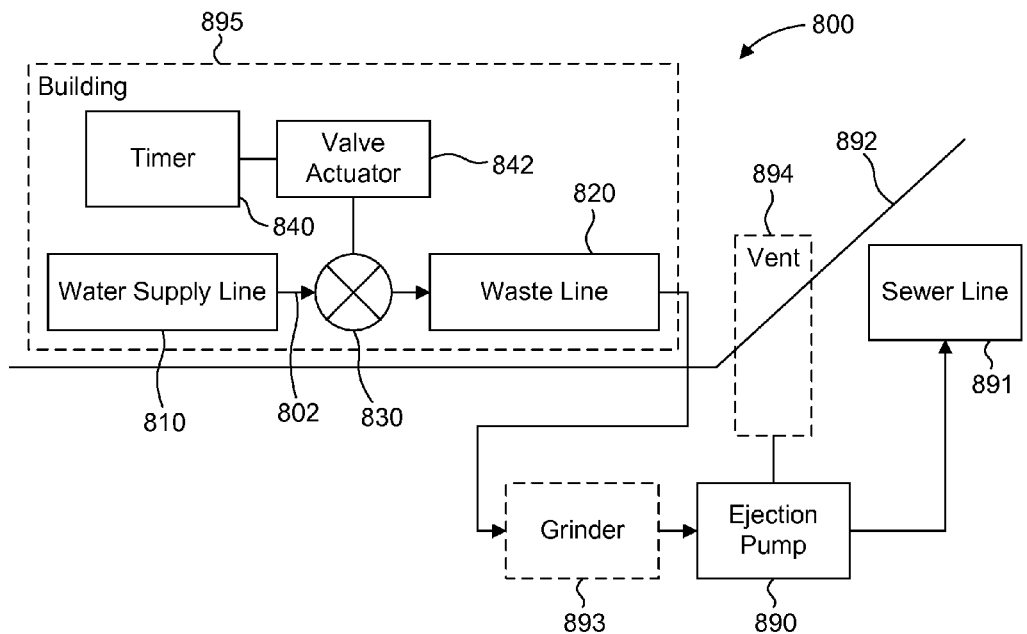
FIG. 8 is a schematic illustration of a plumbing freeze protection system in accordance with still another example of the present disclosure.

With reference to FIG. 8, illustrated is an embodiment of a plumbing freeze protection system 800. As with previously discussed embodiments, the system can include a fluid connection 802 between a water supply line 810 and a waste line 820 with flow that is regulated by a valve 830 controlled by a timer 840 via a valve actuator 842. The timer, valve actuator, and valve can be disposed in a building 895. In this embodiment, the waste line is fluidly coupled to a sewer line 891 via an ejection pump 890. The ejection pump can be located below a ground level 892. In this situation, a downward slope out of the building to the sewer line cannot be created. In this case, the ejection pump can be used to pump waste up to the sewer line. A grinder 893 can be associated with the ejection pump to grind solid waste matter prior to pumping. In some embodiments, the ejection pump can be located outside of the building containing the fluid connection 802. Ejection pumps are often ventilated with ambient above ground atmosphere by a vent 894. A common cause of failure for ejection pumps is freezing of the waste in or near the ejection pump and/or the grinder by cold air from the vent. Thus, when the valve is open for a predetermined time period, the short duration, high volumetric flow rate of water delivered to the waste line can minimize ice formation and remove existing ice from the ejection pump and/or the grinder, as well as the water supply and waste lines.

The ejection pump 890 can be configured to automatically pump when a certain waste level is reached. Thus, providing water to the pump can also cause the pump to operate, which can be beneficial for the pump as it prevents stagnation and exercises and lubricates the seals and other parts that can crack or weaken from non-use. In some embodiments, an ejection pump can be located inside of a building, which can protect the ejection pump, as well as an incoming waste line and an outlet pressure line, from cold outside temperatures. In this case, protection from ice formation may be of secondary importance compared to benefits derived from operating the pump, and exercising and lubricating the seals.

Figure 9:
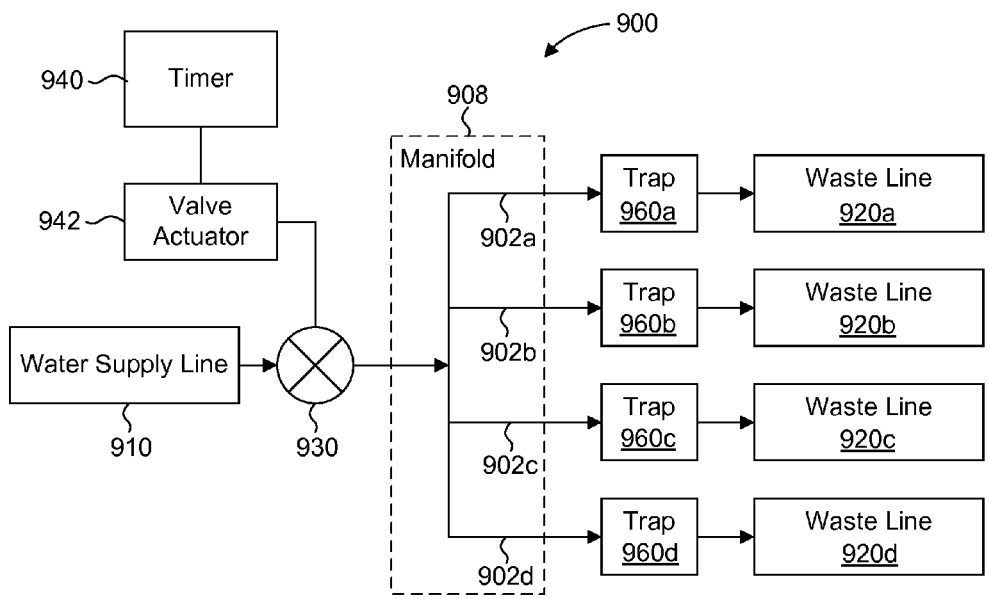
FIG. 9 is a schematic illustration of a plumbing maintenance system in accordance with an example of the present disclosure.

Illustrated in FIG. 9 is an embodiment of a plumbing maintenance system 900. The system can include a valve 930 controlled by a timer 940 via a valve actuator 942, as disclosed herein. In this embodiment, a plurality of fluid connections 902a-d exist between a water supply line 910 and a plurality of waste lines 920a-d, respectively. Each waste line can be fluidly connected with a trap seal 960a-d. The valve can be operable to alternately prevent and allow water flow from the water supply line to the plurality of waste lines. The timer can control the valve such that the valve is open for a predetermined time period to deliver water for a short duration to the plurality of waste lines in order to maintain water in the trap seals. This can be useful to maintain every trap seal in a building from one central valve. In one aspect, a manifold 908 can form, at least in part, the plurality of fluid connections between the water supply line and the plurality of waste lines. Thus, the manifold can comprise a structure that includes an inlet to receive water from the supply line and outlets to deliver water to the plurality of waste lines.

Of course, in one aspect, the valve 930 can be operable to allow water flow from the water supply line 910 to the plurality of waste lines 920a-d within about 25 percent of maximum volumetric flow rate of the water supply line through the plurality of fluid connections 902a-d. Delivery of a high volumetric flow rate of water during the open valve time period can minimize ice formation and remove existing ice from the water supply line, the trap seals 960a-d, and the plurality of waste lines. Thus, the timer can be programmed to deliver water flow merely sufficient to maintain the trap seals, or enough to maintain the supply and waste lines free of ice.

While the foregoing examples are illustrative of the principles and concepts discussed herein, it will be apparent to those of ordinary skill in the art that numerous modifications in form, usage and details of implementation can be made without the exercise of inventive faculty, and without departing from those principles and concepts. Accordingly, it is not intended that the principles and concepts be limited, except as by the claims set forth below.

What is claimed is:

1. A plumbing freeze protection system, comprising:
a fluid connection between a water supply line and a waste line, wherein the fluid connection bypasses a plumbing fixture fluidly connected to the water supply line;
a valve operable with the fluid connection to alternately prevent water flow from the water supply line to the waste line, and allow water flow from the water supply line to the waste line at a high volumetric flow rate defined as being within 25 percent of maximum volumetric flow rate of the water supply line through the fluid connection; and
a timer adapted to control the valve, wherein the timer is adapted to open the valve for a predetermined time period to deliver a the high volumetric flow rate of water to the waste line to minimize ice formation in, and remove existing ice from, the water supply and waste lines,
wherein the water supply line includes a cold water line and a hot water line, and further comprising a mixing valve at the fluid connection between the water supply line and the waste line, the mixing valve fluidly connecting the cold water line and the hot water line, such that flow through the mixing valve allows for flow through the cold and hot water lines to minimize ice formation in, and remove existing ice from, the cold and hot water lines.

2. The system of claim 1, wherein the fluid connection bypasses a drain for the plumbing fixture fluidly connected to the waste line.

3. The system of claim 1, wherein the plumbing fixture comprises a faucet, the water supply and waste lines are fluidly connected via a sink or a bathtub, and the delivery of water maintains a water seal in a trap associated with the sink or bathtub.

4. The system of claim 1, wherein the plumbing fixture comprises a washing machine.

5. The system of claim 1, wherein at least one of the water supply line and the waste line are fluidly connected via a three-way connector to provide for normal use of the plumbing fixture.

6. The system of claim 1, wherein the valve is actuated by a solenoid and the solenoid receives a command signal from the timer.

7. The system of claim 1, wherein the timer includes a user interface to facilitate programming of the timer.

8. The system of claim 1, wherein the timer includes a display.

9. The system of claim 1, wherein the timer is powered by at least one of alternating current and direct current.

10. The system of claim 1, wherein the timer and the valve are disposed in a housing.

11. The system of claim 10, wherein the housing includes an inlet port to receive water from the water supply and an outlet port to discharge water to the waste line.

12. The system of claim 1, wherein the timer is controllable remotely via computer network.

13. The system of claim 1, further comprising a thermocouple or a thermometer associated with the timer which provides at least partial control of the timer.

14. The system of claim 1, wherein the timer is adapted to open the valve for a period of time ranging from a few seconds to a few minutes.

15. A plumbing maintenance system, comprising:
a plurality of fluid connections between a water supply line and a plurality of waste lines, each waste line being fluidly connected with a trap seal;
a manifold to form, at least in part, the plurality of fluid connections between the water supply line and the plurality of waste lines
a valve operable with the plurality of fluid connections to alternately prevent water flow from the water supply line to the plurality of waste lines, and allow water flow from the water supply line to the plurality of waste lines; and
a timer adapted to control the valve, wherein the timer is adapted to open the valve for a predetermined time period to deliver the water flow to the plurality of waste lines to maintain water in the trap seals.

16. The system of claim 15, wherein the valve is operable to allow water flow from the water supply line to the plurality of waste lines within 25 percent of maximum volumetric flow rate of the water supply line through the plurality of fluid connections, such that a high volumetric flow rate of water is delivered during the open valve time period to minimize ice formation in, and remove existing ice from, the water supply line and the plurality of waste lines.

17. The system of claim 15, wherein the timer is controllable remotely via computer network.

18. The system of claim 15, further comprising a thermocouple or a thermometer associated with the timer which provides at least partial control of the timer.

19. The system of claim 15, wherein the timer is adapted to open the valve for a period of time ranging from a few seconds to a few minutes.

* * * * *